United States Patent
Han et al.

(10) Patent No.: US 12,088,779 B2
(45) Date of Patent: Sep. 10, 2024

(54) OPTICAL FLOW BASED OMNIDIRECTIONAL STEREO VIDEO PROCESSING METHOD

(71) Applicant: BOYAN TECHNOLOGIES (SHENZHEN) CO., LTD, Guangdong (CN)

(72) Inventors: Yuxing Han, Beijing (CN); Jiangtao Wen, Guangdong (CN); Minhao Tang, Beijing (CN); Yu Zhang, Beijing (CN); Jiawen Gu, Beijing (CN); Bichuan Guo, Beijing (CN); Ziyu Zhu, Beijing (CN)

(73) Assignee: BOYAN TECHNOLOGIES (SHENZHEN) CO., LTD, Shenzhen (CN)

(*) Notice: Subject to any disclaimer, the term of this patent is extended or adjusted under 35 U.S.C. 154(b) by 211 days.

(21) Appl. No.: 17/677,241

(22) Filed: Feb. 22, 2022

(65) Prior Publication Data

US 2022/0182595 A1    Jun. 9, 2022

Related U.S. Application Data

(63) Continuation of application No. PCT/CN2019/102078, filed on Aug. 22, 2019.

(51) Int. Cl.
*H04N 5/335* (2011.01)
*G06T 3/4038* (2024.01)
(Continued)

(52) U.S. Cl.
CPC ......... *H04N 13/167* (2018.05); *G06T 3/4038* (2013.01); *G06T 7/292* (2017.01)

(58) Field of Classification Search
CPC .................................................. G06T 7/292
See application file for complete search history.

(56) References Cited

U.S. PATENT DOCUMENTS

2017/0295354 A1* 10/2017 Cabral ..................... G06T 7/33
2018/0063513 A1*  3/2018 Bar ....................... G03B 35/08
(Continued)

FOREIGN PATENT DOCUMENTS

CN    105141920 A    12/2015
CN    107067368 A     8/2017
(Continued)

OTHER PUBLICATIONS

First Office Action and Search Report issued by the China National Intellectual Property Office for Chinese Patent Application No. 201980099652.6, issued on Jul. 31, 2024, with an English translation.

*Primary Examiner* — Gary C Vieaux
(74) *Attorney, Agent, or Firm* — MYERS WOLIN, LLC

(57) ABSTRACT

A video processing method, including: acquiring a plurality of raw videos, the plurality of raw videos being videos acquired by a plurality of dynamic image recorders arranged according to preset locations; determining an overlapping region between every two adjacent raw videos according to preset rules corresponding to the preset locations, the adjacent raw videos being the raw videos acquired by the dynamic image recorders arranged adjacent to each other; performing multi-stage optical flow calculation on the raw videos in each overlapping region to obtain a plurality of pieces of target optical flow information; and splicing the overlapping region of every two adjacent raw videos based on the target optical flow information to obtain target videos.

15 Claims, 5 Drawing Sheets

(51) Int. Cl.
    *G06T 7/292*     (2017.01)
    *H04N 13/167*     (2018.01)

(56) References Cited

U.S. PATENT DOCUMENTS

2018/0227484 A1    8/2018  Hung et al.
2018/0295273 A1   10/2018  Li
2020/0213620 A1*  7/2020  Zhao .................... H04N 13/156

FOREIGN PATENT DOCUMENTS

| | | | |
|---|---|---|---|
| CN | 109379577 A | 2/2019 | |
| CN | 109509146 A | 3/2019 | |
| EP | 3 229 470 A1 | 10/2017 | |
| WO | WO-2019052534 A1 * | 3/2019 | ............... G06T 3/40 |

\* cited by examiner

OPTICAL FLOW BASED OMNIDIRECTIONAL STEREO VIDEO PROCESSING METHOD

CROSS-REFERENCE TO RELATED APPLICATIONS

The present application is a continuation under 35 U.S.C. § 111 of International Patent Application Serial No. PCT/CN2019/102078 filed on Aug. 22, 2019, the entire contents of which are hereby incorporated by reference in their entirety for all purposes.

BACKGROUND

Virtual reality (VR) technology can bring a user panoramic simulation images and immersive experience, and has been applied to multiple fields such as games, film and television, medicine and design. An ODSV video is an important factor for VR to make the user feel immersed. When the ODSV video is used with an HMD (Head Mounted Display), the user's head movement can be tracked through the display and video contents corresponding to the user's view can be presented.

SUMMARY

The disclosure provides a video processing method, an electronic device and a storage medium.

A first aspect of the disclosure provides a video processing method, including: acquiring a plurality of raw videos, the plurality of raw videos being videos acquired by a plurality of dynamic image recorders arranged according to preset locations; determining an overlapping region between every two adjacent raw videos according to preset rules corresponding to the preset locations, the adjacent raw videos being the raw videos acquired by the dynamic image recorders arranged adjacent to each other; performing multi-stage optical flow calculation on the raw videos in each overlapping region to obtain a plurality of pieces of target optical flow information; and splicing the overlapping region of every two adjacent raw videos based on the target optical flow information to obtain target videos.

A second aspect of the disclosure provides a non-transitory computer readable storage medium, storing a computer program thereon. The program, when being executed by a processor, realizes any one of the steps of the method according to the first aspect of the disclosure.

A third aspect of the disclosure provides an electronic device, including a memory and a processor. The memory stores a computer program thereon, and the processor is configured to execute the computer program in the memory, so as to realize any one of the steps of the method according to the first aspect of the disclosure.

Other features and advantages of the disclosure will be described in detail in the subsequent detailed description part.

BRIEF DESCRIPTION OF THE DRAWINGS

The accompanying drawings are used to provide a further understanding of the disclosure, constitute a part of the specification, and are used to explain the disclosure together with the following specific implementations, but do not constitute a limitation to the disclosure. In the accompanying drawings.

DETAILED DESCRIPTION

Implementations of the disclosure are described in detail below in combination with the accompanying drawings. It should be understood that the implementations described herein are merely used for describing and explaining the disclosure, and are not intended to limit the disclosure.

In order to provide the user with more comfortable and real immersive experience, high quality is required during video correcting (for instance, distortion calibration, or luminance consistency adjustment), splicing, stereo information reconstruction, and subsequent coding, and more details in a raw video need to be preserved during a processing process. In addition, in order to improve instantaneity of a picture and enhance interactivity of the VR, an end-to-end system from a camera lens to the HMD needs to have lower latency.

Figure 1:
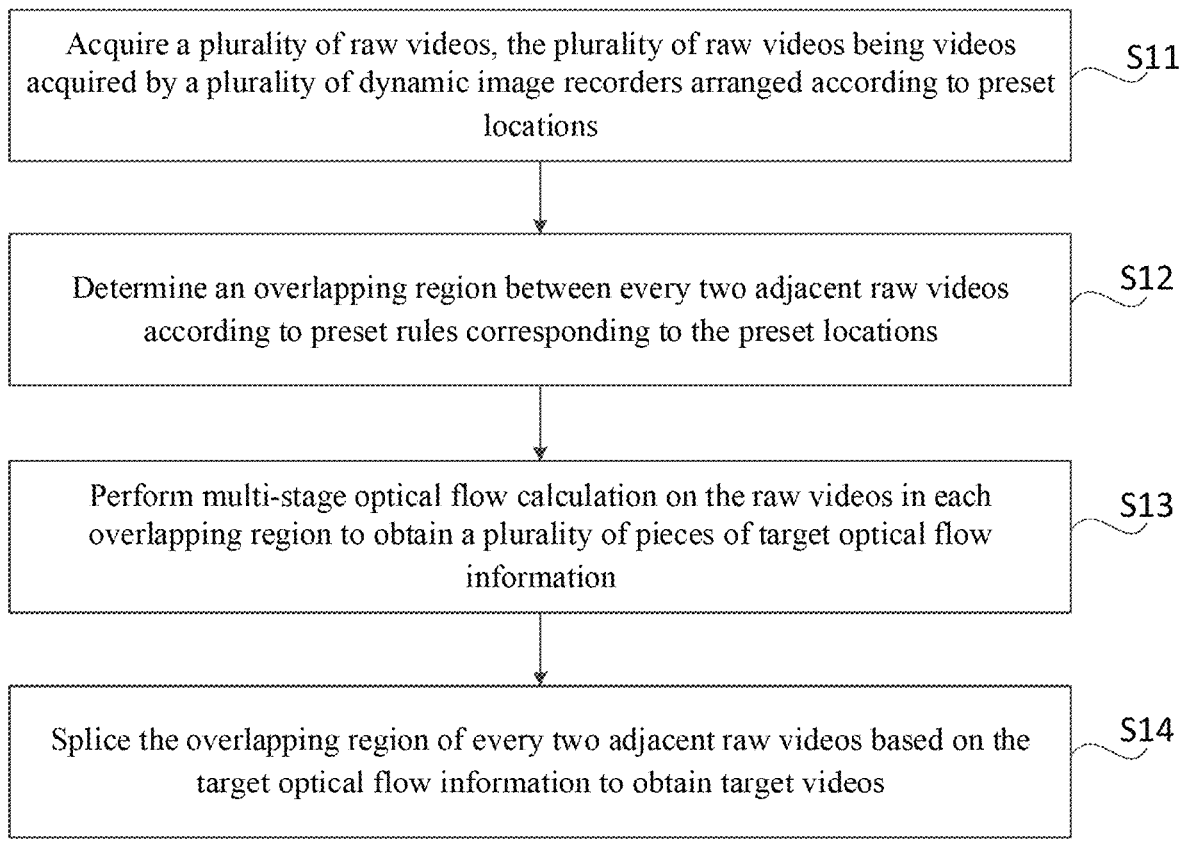
FIG. 1 is a flowchart of a video processing method according to an example of the disclosure.

FIG. 1 is a flowchart of a video processing method according to an example of the disclosure. As shown in FIG. 1, the method includes the following steps.

S11, a plurality of raw videos are acquired, and the plurality of raw videos are videos acquired by a plurality of dynamic image recorders arranged according to preset locations.

The dynamic image recorders may be video cameras, cameras with a shooting function, mobile terminals with a shooting function (such as telephones and table computers), etc. In order to achieve a better shooting effect, subsequent examples of the application are described by taking video cameras as the dynamic image recorders.

Figure 2:
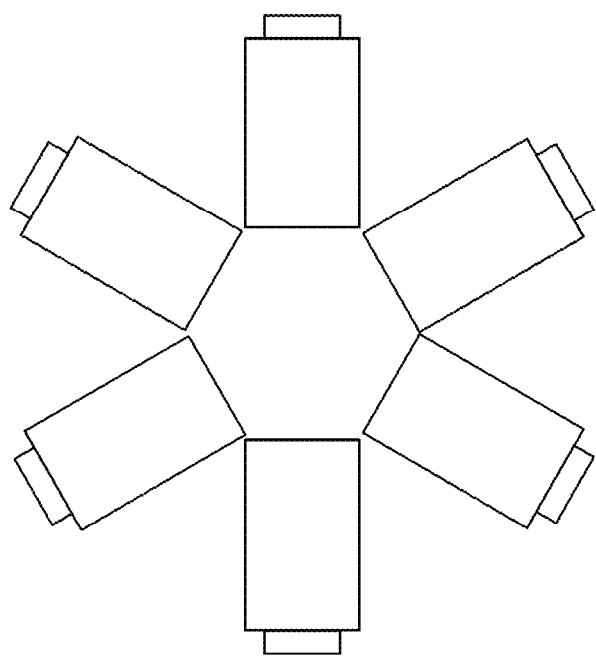
FIG. 2 is schematic diagram of arrangement of dynamic image recorders according to an example of the disclosure.

In order to achieve a panoramic shooting effect, a plurality of video cameras (the quantity being 4, 6, 8, etc.) may be arranged around an axis or an axial line. A relatively small quantity of video cameras may cause serious distortion around a lens or a photography blind spot, while a relatively large number of video cameras may result in larger processing capacity and slower processing speed. FIG. 2 is a schematic diagram of a possible arrangement of dynamic image recorders, where 6 video cameras are arranged equidistantly around an axial line.

It is worth noting that, the raw videos described in the disclosure may be video files that have been shot and need to be processed, or may be images transmitted in real time. For the former, the disclosure may process the raw videos into panoramic videos while retaining more details of the raw videos and maintaining higher image quality. For the latter, the disclosure may process the raw videos into low-latency real-time output panoramic images through a high-efficiency video processing method provided by the disclosure while retaining more details and maintaining higher image quality.

After acquiring the plurality of raw videos, time synchronization may be further performed on the plurality of raw videos, the plurality of raw videos synchronized may be calibrated, and the calibrated raw videos may be set as raw videos subsequently used by the disclosure.

The raw videos acquired by the video cameras are corrected by using video camera parameters, and the video camera parameters include a horizontal FOV, a vertical FOV, a focal length, and a radical distortion coefficient. Imaging distortion is an optical aberration that represents the magnification of an image within a field of view at a fixed imaging distance, while the radial distortion coefficient is configured to describe a relationship between theoretical and actual image heights. If a wide-angle or fisheye lens is used for framing, additionally high barrel distortion will be introduced, and the magnification of the image decreases with the increase of a distance from the image, so objects around an imaging boundary are largely squeezed and need to be stretched.

S12, an overlapping region between every two adjacent raw videos is determined according to preset rules corresponding to the preset locations.

The adjacent raw videos are the raw videos acquired by the dynamic image recorders arranged adjacent to each other.

Figure 3:
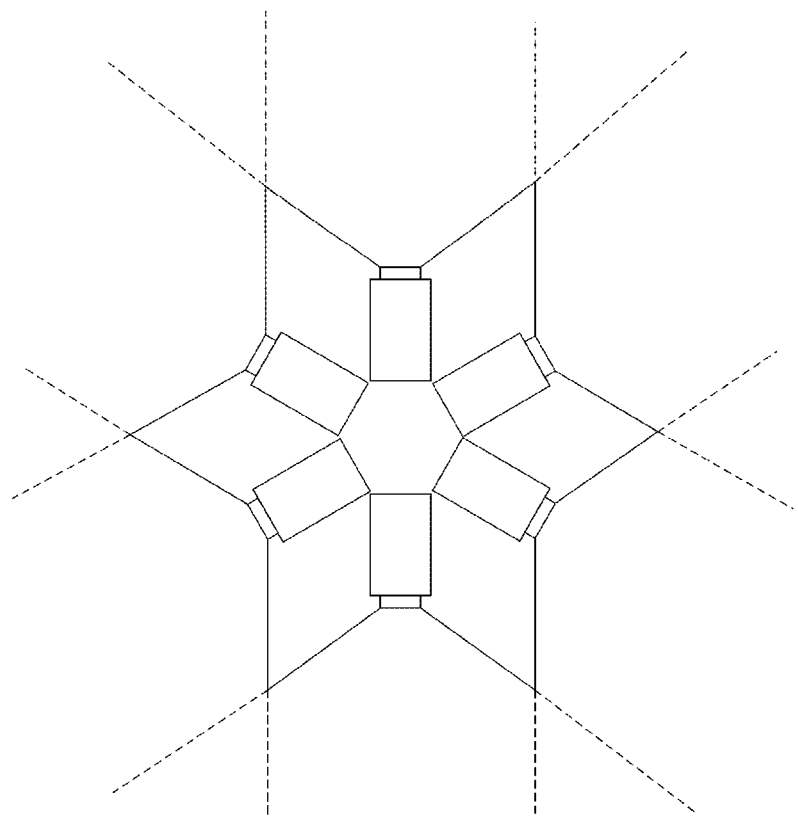
FIG. 3 is a schematic diagram of an overlapping region according to an example of the disclosure.

Different arrangement locations correspond to different rules. For instance, as shown in FIG. 3, a region surrounded by lines extending from two ends of video cameras is a picture that may be acquired by the video cameras. A region surrounded by an included angle formed by dotted lines represents that the region may be simultaneously acquired by two video cameras, and this region is a said overlapping region in the disclosure. A video image in one overlapping region will be acquired by two adjacent cameras.

S13, multi-stage optical flow calculation is performed on the raw videos in each overlapping region to obtain a plurality of pieces of target optical flow information An optical flow is used for representing a pixel movement direction between two images. When displacement of each pixel is calculated, dense optical flows provide a finer-grained and a more intuitive representation of correspondence relationship between the images. For ODSV videos, optical flow information between each frames of videos acquired by adjacent video cameras may provide a reference for a splicing location and a splicing mode of the frame, and may also represent information of an optical parallax caused by different arrangement locations of the video cameras.

FlowNet2-s, a fastest existing optical flow algorithm, takes about 80 ms to generate a spliced frame picture of a size of 4096×2048 pixels, and a processing speed thereof may reach a maximum transmission frame number of 12 fps. For a high-definition ODSV system based on optical flow, to achieve a low-latency real-time effect, at least 25 fps is required for presenting, and the method is far from meeting such requirement. In addition, an optical flow accuracy of the method is much lower than that of a multi-stage optical flow calculation method proposed in the disclosure.

The multi-stage optical flow algorithm refers to that downsampling is performed on same frames under a same moment of two raw videos in one overlapping region respectively to form two image sequences with resolution from low to high, optical flow information between the two images is calculated in a two-to-two correspondence mode starting from the images with relatively low resolution, and the optical flow information calculated from the images with the relatively low resolution is added to next stage of optical flow calculation to use as a reference, until optical flow information of the images with relatively high resolution is calculated. Because initial images with the relatively low resolution do not have much available pixel information, a calculation efficiency is high; and after multiple stages of sophisticated calculation, a usable reference is provided for subsequent calculation of the images with the high resolution, so processing time needed for calculation of the images with the high resolution is shorter compared with a traditional optical flow calculation method. In this way, the multi-stage optical flow algorithm may improve calculation speed and calculation accuracy of the optical flow.

In one implementation, performing multi-stage optical flow calculation on two raw videos in one overlapping region includes:

operations as follows are performed on each frame of picture of the two raw videos in the overlapping region:

downsampling is performed on corresponding frames of pictures of the two raw videos respectively to obtain two image sequences arranged from low resolution to high resolution. For instance, if a resolution of a raw video is 1125, then downsampling is performed on a certain frame of this raw video, and an image sequence with resolutions respectively being 10, 18, 36, 90, 276, and 1125 is generated, where a resolution of a last layer of image is the same as the raw video.

A first initial optical flow information of a first image in a first image sequence relative to an image with a corresponding resolution in a second image sequence is determined. The first image is an image with a lowest resolution in the image sequence.

Optical information of first target images in the first image sequence relative to images with corresponding resolutions in the second image sequence is determined based on the first initial optical flow information, and the optical information of the first target images relative to the images with the corresponding resolutions in the second image sequence is set as the first initial optical flow information. The first target images are images other than the first image in the first image sequence.

Step of determining the optical information of the first target images relative to the images with the corresponding resolutions in the second image sequence based on the first initial optical flow information is executed repeatedly according to a sequence of resolutions of the first target images from low to high, until final optical flow information of images with same resolutions as the raw videos in the first image sequence relative to the images with the corresponding resolutions in the second image sequence is determined, and the final optical flow information is set as the target optical flow information corresponding to the target frames of pictures.

In other words, multi-stage optical flow calculation is performed on each frame of the raw videos, and accurate target optical flow information may be obtained.

In another implementation, calculating the target optical flow information of the raw videos in the overlapping region may also comprise:

types of the adjacent frames of pictures are determined according to a relevance degree between the target frames of pictures and adjacent frames of pictures, after the target optical flow information of the target frames of pictures is obtained. The types of the adjacent frames of pictures are divided into I frames and P frames. The P frames are pictures with a relevance degree with the I frames, have similar picture features to the I frames, and may be obtained by performing data transformation on the basis of the I frames, while the I frames have a relatively low relevance degree with previous frames and cannot be obtained by performing simple data transformation on the basis of the previous frames.

When the adjacent frames of pictures are I frames of pictures, downsampling is performed on them and stage-by-stage multi-stage optical flow calculation is performed on them, by using the method in the above implementation.

When the adjacent frames of pictures are P frames of pictures, optical flow information of preset images in the first image sequence of the adjacent frames of pictures relative to images with corresponding resolutions in the second image sequence is determined based on the target optical flow information of the target frames of pictures, and the optical flow information of the preset images relative to the images with the corresponding resolutions in the second image sequence is set as second initial optical flow information.

Step of determining optical flow information of the second target images relative to the images with the corresponding resolutions in the second image sequence based on the second initial optical flow information is executed repeatedly according to a sequence of resolutions of the second target images from low to high, until the final optical flow information of the images with the same resolutions as the raw videos in the first image sequence relative to the images with the corresponding resolutions in the second image sequence is determined, and the final optical flow information is set as the target optical flow information corresponding to the adjacent frames of pictures. The second target images are images with higher resolutions than the preset images in the first image sequence of the adjacent frames of pictures.

At this moment, the preset images in the first image sequence are not necessarily images with lowest resolutions. On the basis of precise optical flow information of the previous frame serves as a reference, calculation of a few stages of images with relatively low resolutions may be ignored, and multi-stage optical flow calculation may be performed only on subsequent stages of images with higher resolutions, so that an efficiency of optical flow calculation may be improved and calculation time may be saved.

It is worth noting that, before performing optical flow calculation, the frames of pictures may be pre-processed to eliminate pixel value differences caused by different lens exposure, setting of lens diaphragms or influence of video coding.

In one implementation, Sobel features in the target frames of pictures are determined, and an error function in optical flow calculation is determined based on the Sobel features.

A Sobel feature matrix may be used as features on a normalized luminance component of an output image in optical flow calculation, and the error function may be calculated through the following formula.

$$err(x,y,\Delta x,\Delta y) = (I_{0x}(x,y) - I_{1x}(x+\Delta x, y+\Delta y))^2 + (I_{0y}(x,y) - I_{1y}(x+\Delta x, y+\Delta y))^2 + c^2((\Delta x - \overline{\Delta x})^2 + (\Delta y - \overline{\Delta y})^2)$$

where $I_{0x}(x,y)$ is an x component of a Sobel feature of a pixel point (x,y), $I_{0y}(x,y)$ is a y component of the Sobel feature of the pixel point (x,y), $I_{1x}(x+\Delta x, y+\Delta y)$ is an x component of a Sobel feature of a pixel point (x+Δx,y+Δy), $I_{1y}(x+\Delta x, y+\Delta y)$ is a y component of the Sobel feature of the pixel point (x+Δx,y+Δy), (Δx,Δy) is an optical flow of the pixel point (x,y), c is a smoothing factor of coherence constraint optimization and may be reciprocal of an overlapping width, $(\overline{\Delta x}, \overline{\Delta y})$ is a spatial average value of the optical flow.

In addition, when stage-by-stage optical flow calculation is performed, a hexagonal iterative method may be used to find the optical flow of each pixel point. A side length of a hexagon is expanded at each iteration, and an optimal optical flow is found in a hexagonal region at each iteration. The side length of the hexagon used by iteration may avoid taking a relatively small value, so as to reduce an error that iterative search falls into a locally smallest value. Further, because the previous stages of images with relatively low resolutions do not have much information, the number of iteration may be set to be small; and because optical flow information obtained at previous stages has been pre-arranged in subsequent stages of images with relatively high resolutions, the optimal optical flow can be found without an excessively large number of iteration. The number of iteration may be inversely proportional to the resolutions, and are at most 10 times, which can not only ensure an efficiency of iteration but also ensure quality of the optical flow obtained by iteration.

In addition, in one implementation, candidate optical flow information is determined by using a gradient descent method on the basis of the initial optical flow information obtained at each stage, and the optical flow information of the target images may be determined based on the initial optical flow information and/or the candidate optical flow information. In this way, the error that iterative search generates the locally smallest value may also be avoided.

The candidate optical flow information may be acquired through the following formula.

$$\Delta \hat{X}_n = \Delta \tilde{X}_n - \gamma \frac{\partial}{\partial \Delta \tilde{X}} err(x, y, \Delta \tilde{X}, \Delta \tilde{Y})$$

$$\Delta \hat{Y}_n = \Delta \tilde{Y}_n - \gamma \frac{\partial}{\partial \Delta \tilde{Y}} err(x, y, \Delta \tilde{X}, \Delta \tilde{Y})$$

where $(\Delta \hat{X}_n, \Delta \hat{Y}_n)$ is a candidate optical flow of an $n^{th}$ stage, $(\Delta \tilde{X}_n, \Delta \tilde{Y}_n)$ is a target optical flow of the $n^{th}$ stage, and γ is a step length of gradient descending.

In addition, because pixels in some regions in the pictures tend to be still between frames, and almost have no changes, these regions may be recognized by calculating regional energy of the regions, and pixel points in these regions may be ignored in optical flow calculation, so as to reduce a calculation volume of optical flow calculation.

S14, the overlapping region between every two adjacent raw videos are spliced based on the target optical flow information to obtain target videos.

A correspondence relationship between picture pixels of images in the overlapping region may be determined based on the target optical flow information, so as to determine a splicing relationship between pictures, realize panoramic splicing and reduce splicing traces.

In an example, considering application of panoramic videos in ODSV videos, when splicing is performed to obtain the target videos, the overlapping regions may also be spliced according to distances between the dynamic image recorders, interpupillary distance information and the target optical flow information to obtain two target videos respectively for a left eye and a right eye.

Since stereo vision is caused by a depth of field of an object and corresponding binocular disparity, stereo vision may be reconstructed in ODSV given a camera distance, an interpupillary distance, and per-pixel disparity (i.e., an optical flow).

Figure 4:
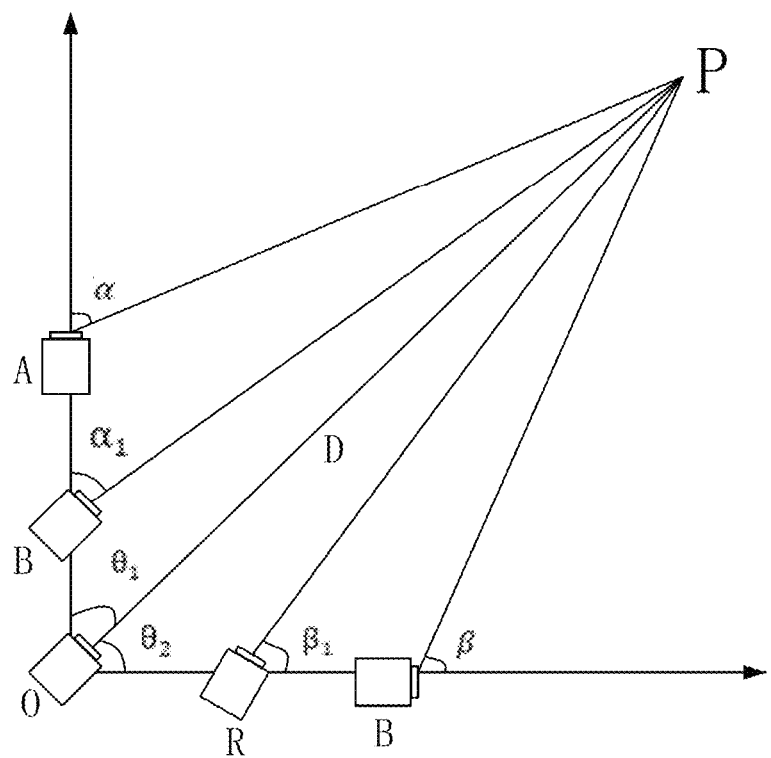
FIG. 4 is a diagram of an overlapping region of an ODSV shooting system according to an example of the disclosure.
Figure 5:
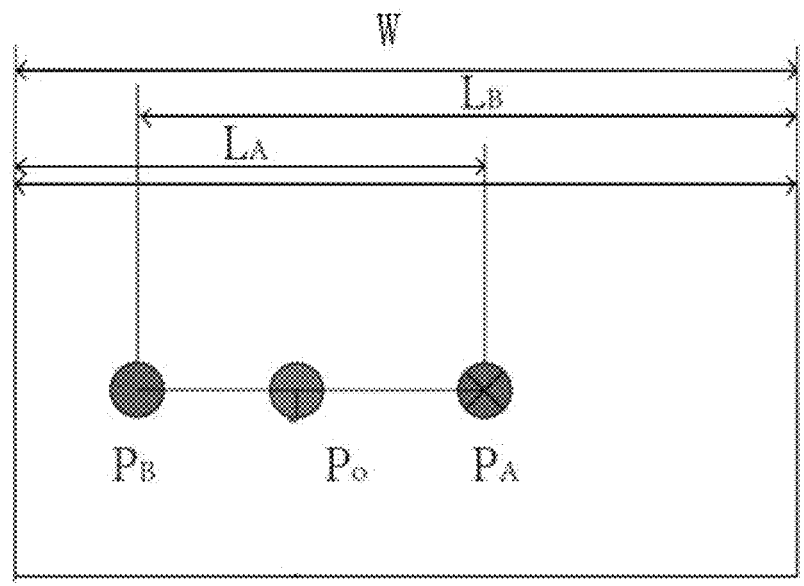
FIG. 5 is another diagram of an overlapping region of an ODSV shooting system according to an example of the disclosure.

FIG. 4 is a diagram of an overlapping region of an ODSV shooting system. The system is constituted by four video cameras evenly located on the equator. A and B are locations of left video camera and right video camera respectively, and L and R are respectively the left eye and the right eye. Line segments AB and LR respectively represent the distance between cameras and a general pupil distance, and point P is a location of the object. FIG. 5 is another diagram of an overlapping region of an ODSV shooting system. A quarter-sphere space is flattened into a rectangular image by using ERP. An ERP overlap has a constant pitch coordinate system where a vertical axis is latitude and a horizontal axis is longitude. Four edges of a rectangle in FIG. 5 may be found through one-to-one correspondence in FIG. 4. A left side of the rectangle in FIG. 5 is an optical axis of a video camera A, i.e. y axis in FIG. 4. A right side of the rectangle in FIG. 5 is an optical axis of a video camera B, i.e. x axis in FIG. 4. A top side and a bottom side of the rectangle in FIG. 5 are extending north pole and south pole of the quarter-sphere space. $P_A$ and $P_B$ are imaging locations of a same point (P) in the video camera A and the video camera B. Line segments $L_B$ and $L_A$ in FIG. 5 are distances between imaging points and corresponding optical axes, which are directly proportional to $\alpha$ and $\beta$ (i.e. horizontal included angles between the optical axes and input light of P) in FIG. 4. Specifically, $$F_{AB} = P_A P_B = L_B + L_A - W, \alpha = \frac{L_A}{W}\pi/2, \text{ and } \beta = \frac{L_B}{W}\pi/2,$$

where w represents a width of the overlapping region. For monocular application, an observation point is an origin (O) in FIG. 4, and imaging locations of any items are the same relative to binocular application. Therefore, a theoretical imaging angle $\theta_2$ of P may be calculated by the following formula.

$$\frac{D}{\sin\alpha} = \frac{OA}{\sin(\alpha - \theta_1)}$$

$$\frac{D}{\sin\beta} = \frac{OA}{\sin(\beta - \theta_2)}$$

$$\tan\theta_1 = \frac{\sin\alpha(\cos\beta + \sin\alpha)}{\sin\beta(\cos\alpha + \sin\alpha)}$$

where D is a distance between O and P, and OA=OB represents a radius of a camera lens.

At the same time, in binocular observation, two independent observation points L and R are introduced, and imaging angles $\alpha 1$ and $\beta 1$ of the point P may be calculated through the following equation.

$$\tan\alpha_1 = \frac{D \cdot \sin\theta_1}{D \cdot \cos\theta_1 - OL}$$

$$\tan\beta_1 = \frac{D \cdot \sin\theta_2}{D \cdot \cos\theta_2 - OL}$$

where OL is a distance between O and L. Without considering special cases, the above calculation is applicable to a single video camera, and in the ODSV system, two pairs of imaging angles may be calculated separately by two calculations.

The above method can be used for non-shielded regions, where the object may be captured by two adjacent video cameras at the same time. However, for shielded parts, pictures captured by a single video camera will lose details. In these regions, co-localized directions from the two video cameras have different depths of field (one foreground and one background), and a 0 value calculated using $\alpha$ and $\beta$ from left and right video cameras are completely different in the absence of references from other adjacent video cameras.

A first step to solve shielded regions is to recognize them. For the non-shielded regions, optical flows from left to right and from right to left are roughly opposite, i.e. $F_{LR}(x,y)+F_{RL}(x, y)\approx 0$, while the relationship is no longer applicable to the shielded regions. Therefore, the following vector length-based ranking rule is used to find the shielded regions:

$$R_{occ} = \frac{2 \times |F_{LR}| \times |F_{RL}|}{|F_{LR}|^2 + |F_{RL}|^2}$$

where | . . . | refers to Euclidean length of a vector. The vector length-based ranking rule instead of a dot product-based ranking rule is adopted because an optical flow of a background is usually small and may be polluted by a noise in calculation. Whether a current pixel should be filled with foreground content may be checked through a synthesis method described in the above formula of calculating the imaging angles, so as to determine a background region and a foreground region. Further, a result of shielding detection of a previous frame is also used for reducing a noise of shielding detection of the current frame.

Once a shielded region is determined, a foreground object of a virtual viewpoint may be generated by using information from only one video camera (for instance, a right side part of the left video camera is used). Correspondingly, a picture of the right video camera is used to synthesize a right side shielded part, and a picture of the left video camera is used to synthesize a left side shielded part. Because rendering methods are different for three regions (the left side shielded part, the right side shielded part and a non-shielded part), which may result in discontinuity at a boundary. In order to solve the problem, a Gaussian filter is applied to the boundary to ensure smooth transition between different regions and to reduce binocular rivalry.

It is worth noting that, after obtaining the target videos, ODSV video coding may be performed on the target videos so that the videos may be presented in a VR system.

In an example, when coding is performed, background blocks and object blocks in the target videos may be partitioned based on the target optical flow information; and ODSV video coding is performed on the target videos according to a result of partitioning, so as to increase a coding efficiency.

Spatial distribution of optical flows may be used for segmenting objects from a background, an intra-frame variance and inter-frame variables may be obtained based on the optical flow information, and the intra-frame variance and inter-frame variables are configured to represent spatial and temporal variances of the optical flow of a current partition.

The intra-frame variance represents a time change of the optical flow of a current block, and if the current block is a part of a static background or a static object, it means that the intra-frame variance is very small. Under the case, adopting a coding manner with a skip mode and a combined mode usually leads to a relatively high efficiency, because motion vectors of these regions will maintain unchanged.

Because a changing object usually has a certain depth, a pixel in the changing object should contain an optical flow value of a similar height (i.e. a similar parallax degree and a relatively small inter-frame variable value). Under the case, the partition does not need to be segmented into very small segments. On the contrary, a large inter-frame variable represents that a region has more details and is finer in motion expression, so there is a necessity of partitioning.

Through the above technical method, at least the following technical effects may be achieved:

The optical flows of the overlapping regions of the acquired raw videos are calculated through a manner of multi-stage optical flow calculation, and the overlapping regions of the raw videos are spliced based on the target optical flow information obtained through calculation, so a spliced video with finer pictures, a relatively real splicing effect and relatively low latency can be obtained at shorter calculation time and higher calculation efficiency.

Figure 6:
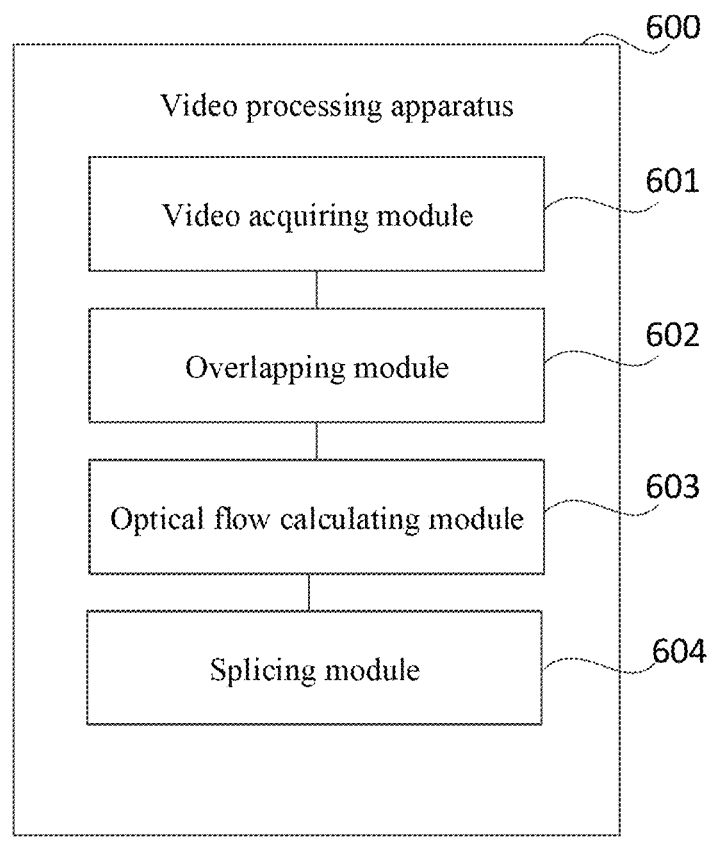
FIG. 6 is a block diagram of a video processing apparatus according to an example of the disclosure.

FIG. 6 is a block diagram of a video processing apparatus according to an example of the disclosure. As shown in FIG. 6, the apparatus 600 includes:

a video acquiring module 601, configured to acquire a plurality of raw videos, the plurality of raw videos being videos acquired by a plurality of dynamic image recorders arranged according to preset locations within a same period of time;

an overlapping module 602, configured to determine an overlapping region between every two adjacent raw videos according to preset rules corresponding to the preset locations, the adjacent raw videos being the raw videos acquired by the dynamic image recorders arranged adjacent to each other;

an optical flow calculating module 603, configured to perform multi-stage optical flow calculation on the raw videos in each overlapping region to obtain a plurality of pieces of target optical flow information; and a splicing module 604, configured to splice the overlapping region of every two adjacent raw videos based on the target optical flow information to obtain target videos.

In an example, the apparatus further includes a time synchronization module and a calibration module. The time synchronization module is configured to perform time synchronization on the plurality of raw videos; the calibration module is configured to calibrate the plurality of synchronized raw videos; the overlapping module is configured to determine the overlapping region between every two adjacent calibrated raw videos according to the preset rules corresponding to the preset locations; and the splicing module is configured to splice the overlapping region between every two adjacent calibrated raw videos based on the target optical flow information.

In an example, the optical flow calculating module includes a plurality of optical flow calculating sub-modules. Each optical flow calculating sub-module is configured to perform operations as follows on a plurality of target frames of pictures of the two raw videos in the overlapping region: performing downsampling on corresponding frames of pictures of the two raw videos respectively to obtain two image sequences arranged from low resolution to high resolution; determining a first initial optical flow information of a first image in a first image sequence relative to an image with a corresponding resolution in a second image sequence, the first image being an image with a lowest resolution in the image sequence; determining optical information of first target images in the first image sequence relative to images with corresponding resolutions in the second image sequence based on the first initial optical flow information, and setting the optical information of the first target images relative to the images with the corresponding resolutions in the second image sequence as the first initial optical flow information, the first target images being images other than the first image in the first image sequence; and executing repeatedly, according to a sequence of resolutions of the first target images from low to high, step of determining the optical information of the first target images relative to the images with the corresponding resolutions in the second image sequence based on the first initial optical flow information, until final optical flow information of images with same resolutions as the raw videos in the first image sequence relative to the images with the corresponding resolutions in the second image sequence is determined, and setting the final optical flow information as the target optical flow information corresponding to the target frames of pictures.

In an example, the optical flow calculating module further includes a candidate calculating sub-module, configured to determine candidate optical flow information by using a gradient descent method on the basis of each piece of the initial optical flow information. The optical flow calculating sub-module is further configured to determine the optical flow information of the target images in the first image sequence relative to the images with the corresponding resolutions in the second image sequence based on the initial optical flow information and/or the candidate optical flow information.

In an example, the optical flow calculating module further includes a function determining sub-module, configured to determine Sobel features in the target frames of pictures; and determine an error function in optical flow calculation based on the Sobel features.

In an example, the optical flow calculating module further includes a frame processing sub-module, configured to determine, according to a relevance degree between the target frames of pictures and adjacent frames of pictures, types of the adjacent frames of pictures, after obtaining the target optical flow information of the target frames of pictures; determine, when the adjacent frames of pictures are P frames of pictures, optical flow information of preset images in the first image sequence of the adjacent frames of pictures relative to images with corresponding resolutions in the second image sequence based on the target optical flow information of the target frames of pictures, and set the optical flow information of the preset images relative to the images with the corresponding resolutions in the second image sequence as second initial optical flow information; and execute repeatedly, according to a sequence of resolutions of second target images from low to high, step of determining optical flow information of the second target images relative to the images with the corresponding resolutions in the second image sequence based on the second initial optical flow information, until the final optical flow information of the images with the same resolutions as the raw videos in the first image sequence relative to the images with the corresponding resolutions in the second image sequence is determined, and set the final optical flow information as the target optical flow information corresponding to the adjacent frames of pictures, the second target images being images with higher resolutions than the preset images in the first image sequence of the adjacent frames of pictures.

In an example, the splicing module is further configured to splice the overlapping regions according to distances between the dynamic image recorders, interpupillary distance information and the target optical flow information to obtain two target videos respectively for a left eye and a right eye.

In an example, the apparatus further includes a coding module, configured to partition background blocks and object blocks in the target videos based on the target optical flow information; and perform ODSV video coding on the target videos according to a result of partitioning.

With regard to the apparatus in the above example, specific operation executing manners of the modules have been described in detail in the example related to the method, and detailed description and explanation will not be made here.

By the technical solution, the optical flows of the overlapping regions of the acquired raw videos are calculated through a manner of multi-stage optical flow calculation, and the overlapping regions of the raw videos are spliced based on the target optical flow information obtained through calculation, so a spliced video with finer pictures, a relatively real splicing effect and relatively low latency can be obtained at shorter calculation time and higher calculation efficiency.

Figure 7:
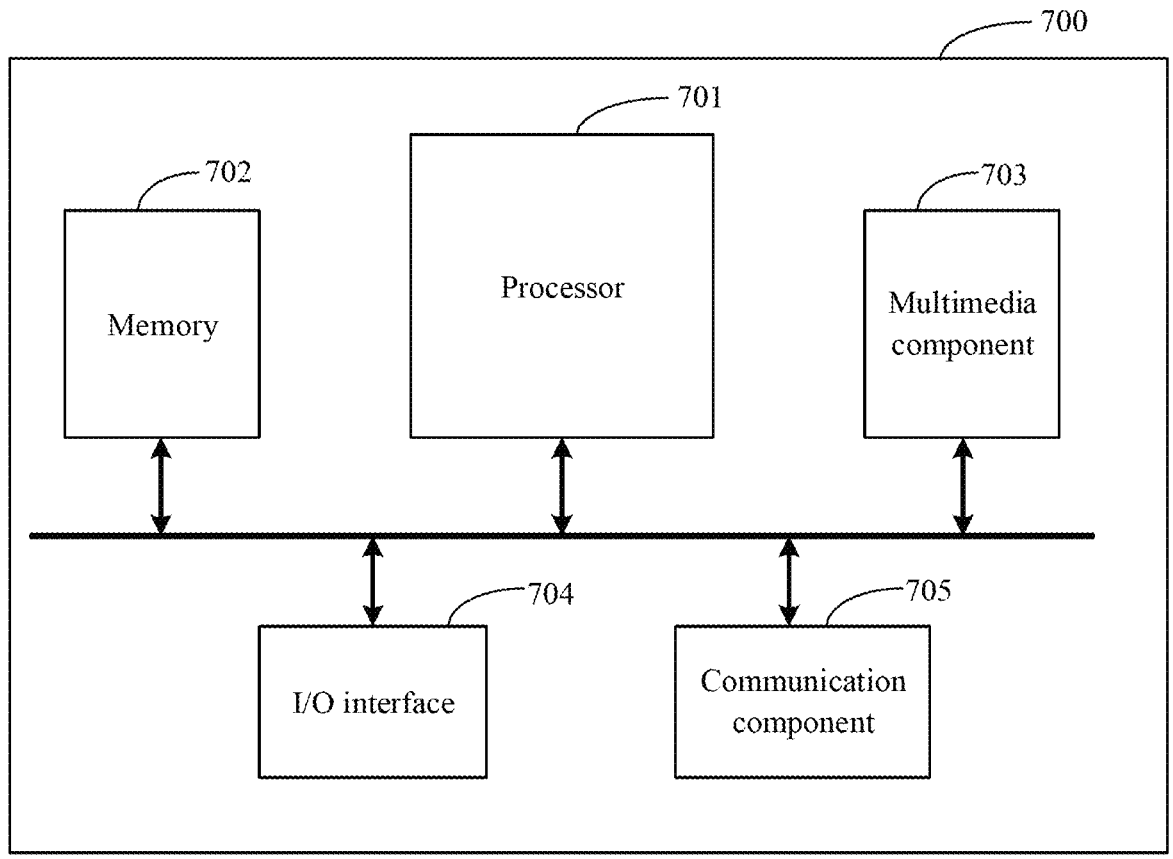
FIG. 7 is a block diagram of an electronic device according to an example of the disclosure.

FIG. 7 is a block diagram of an electronic device 700 according to an example of the disclosure. As shown in FIG. 7, the electronic device 700 may include: a processor 701 and a memory 702. The electronic device 700 may further include one or more of a multimedia component 703, an input/output (I/O) interface 704, and a communication component 705.

The processor 701 is configured to control overall operations of the electronic device 700 to complete all or part of steps in the above video processing method. The memory 702 is configured to store various types of data to support the operations on the electronic device 700, and such data may include, for instance, instructions for any application or method operating on the electronic device 700, and application-related data, such as contact data, messages sent and received, pictures, audio, video, and so on. The memory 702 may be implemented by any type of volatile or nonvolatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk. The multimedia component 703 may include a screen and an audio component. The screen may be, for instance, a touch screen, and the audio component is configured to output and/or input audio signals. For instance, the audio component may include a microphone for receiving external audio signals. The received audio signals may be further stored in the memory 702 or transmitted through the communication component 705. The audio component further includes at least one speaker for outputting audio signals. The I/O interface 704 provides an interface between the processor 701 and other interface modules, and the above-mentioned other interface modules may be a keyboard, a mouse, buttons, and the like. These buttons may be virtual buttons or physical buttons. The communication component 705 is used for wired or wireless communication between the electronic device 700 and other devices. Wireless communication includes, for instance, Wi-Fi, Bluetooth, Near Field Communication (NFC), 2G, 3G, 4G, NB-IOT, eMTC, or 5G, etc., or one or more of their combination, which is not limited here. Therefore, the corresponding communication component 705 may include: a Wi-Fi module, a Bluetooth module, an NFC module and so on.

In one example, the electronic device 700 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic components, so as to execute the above video processing method.

In another example, a computer readable storage medium including a program instruction is further provided. The program instruction, when being executed by a processor, realizes steps of the above video processing method. For instance, the computer readable storage medium may be the above memory 702 including a program instruction, and the program instruction may be executed by a processor 701 of an electronic device 700 to complete the above video processing method.

Figure 8:
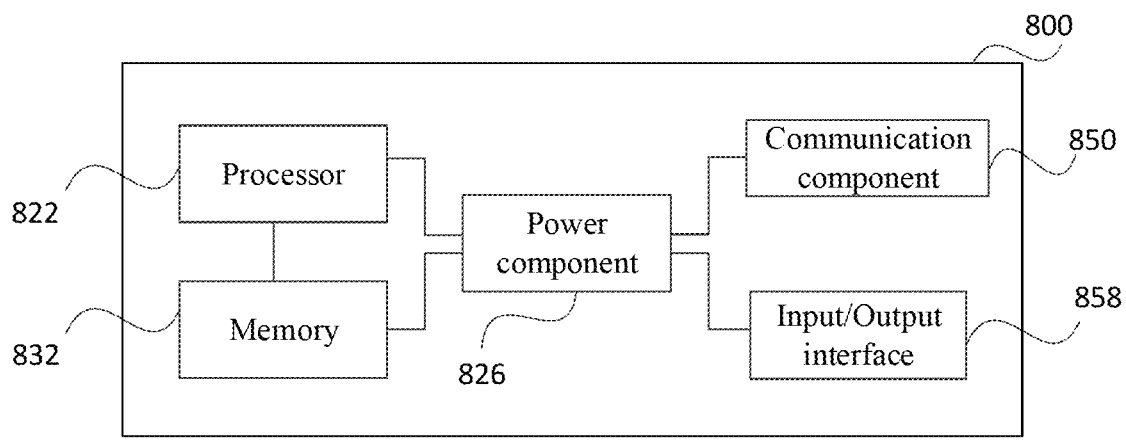
FIG. 8 is a block diagram of an electronic device according to an example of the disclosure.

FIG. 8 is a block diagram of an electronic device 800 according to an example of the disclosure. For instance, the electronic device 800 may be provided as a server. With reference to FIG. 8, the electronic device 800 includes one or a plurality of processors 822, and a memory 832 configured to store a computer program executable by the processors 822. The computer program stored in the memory 832 may include one or more than one modules each corresponding to one set of instructions. In addition, the processors 822 may be configured to execute the computer program so as to execute the above video processing method.

In addition, the electronic device 800 may further include a power component 826 and a communication component 850. The power component 826 may be configured to execute power management of the electronic device 800, and the communication component 850 may be configured to realize communication of the electronic device 800, such as wired or wireless communication. Further, the electronic device 800 may further include an input/output (I/O) interface 858. The electronic device 800 may operate an operation system stored in the memory 832, such as Windows Server™, Mac OS X™, Unix™, Linux™, etc.

In another example, a computer readable storage medium including a program instruction is further provided. The program instruction, when being executed by a processor, realizes steps of the above video processing method. For instance, the computer readable storage medium may be the above memory 832 including a program instruction, and the program instruction may be executed by a processor 822 of an electronic device 800 to complete the above video processing method.

In another example, a computer program product is further provided. The computer program product contains a computer program that can be executed by a programmable apparatus, and the computer program has a code part which, when executed by the programmable apparatus, is configured to execute the above video processing method.

Preferred implementations of the disclosure are described in detail in combination with the accompanying drawings. However, the disclosure is not limited to specific details in the above implementations. Multiple simple transformations can be performed to the technical solutions of the disclosure within the scope of the technical concept of the disclosure. These simple transformations all belong to the protection scope of the disclosure.

It should further be noted that, each technical feature described in the above implementations can be combined in any suitable manner under the condition that there is no contradiction. In order to avoid unnecessary repetition, the disclosure provides no further description on the possible combination manners.

In addition, different implementations of the disclosure can also be combined arbitrarily. As long as they do not violate the spirit of the disclosure, they should also be regarded as the contents disclosed by the disclosure.

What is claimed is:

1. A video processing method, comprising:
acquiring a plurality of raw videos, wherein the plurality of raw videos are videos acquired by a plurality of dynamic image recorders arranged according to preset locations;
determining an overlapping region between every two adjacent raw videos according to preset rules corresponding to the preset locations, wherein the adjacent raw videos are the raw videos acquired by the dynamic image recorders arranged adjacent to each other;
performing a multi-stage optical flow calculation on the raw videos in each overlapping region to obtain a plurality of pieces of target optical flow information; and
splicing the overlapping region of every two adjacent raw videos based on the target optical flow information to obtain target videos;
wherein performing multi-stage optical flow calculation on the raw videos in each overlapping region to obtain the plurality of pieces of target optical flow information comprises:
performing operations as follows on a plurality of target frames of pictures of the two raw videos in the overlapping region:
performing downsampling on corresponding frames of pictures of the two raw videos respectively to obtain two image sequences arranged from low resolution to high resolution;
determining a first initial optical flow information of a first image in a first image sequence relative to an image with a corresponding resolution in a second image sequence, wherein the first image is an image with a lowest resolution in the image sequence;
determining optical information of first target images in the first image sequence relative to images with corresponding resolutions in the second image sequence based on the first initial optical flow information, and setting the optical information of the first target images relative to the images with the corresponding resolutions in the second image sequence as the first initial optical flow information;
wherein the first target images are images other than the first image in the first image sequence; and
executing repeatedly, according to a sequence of resolutions of the first target images from low to high, step of determining the optical information of the first target images relative to the images with the corresponding resolutions in the second image sequence based on the first initial optical flow information, until final optical flow information of images with same resolutions as the raw videos in the first image sequence relative to the images with the corresponding resolutions in the second image sequence is determined, and setting the final optical flow information as the target optical flow information corresponding to the target frames of pictures.

2. The video processing method according to claim 1, wherein after acquiring the plurality of raw videos, the method further comprises:
performing time synchronization on the plurality of raw videos; and
calibrating the plurality of synchronized raw videos;
determining the overlapping region between every two adjacent raw videos according to the preset rules corresponding to the preset locations comprises:
determining an overlapping region between every two adjacent calibrated raw videos according to the preset rules corresponding to the preset locations; and
splicing the overlapping region of every two adjacent raw videos based on the target optical flow information comprises:
splicing the overlapping region between every two adjacent calibrated raw videos based on the target optical flow information.

3. The method according to claim 1, further comprising:
determining a candidate optical flow information by using a gradient descent method on the basis of each piece of the initial optical flow information; and
determining the optical flow information of the target images in the first image sequence relative to the images with the corresponding resolutions in the second image sequence comprises:
determining the optical flow information of the target images in the first image sequence relative to the images with the corresponding resolutions in the second image sequence based on the initial optical flow information and/or the candidate optical flow information.

4. The method according to claim 1, wherein before performing downsampling on the target frames of pictures of the two raw videos respectively, the method further comprises:
determining Sobel features in the target frames of pictures; and
determining an error function in optical flow calculation based on the Sobel features.

5. The method according to claim 1, further comprising:
determining, according to a relevance degree between the target frames of pictures and adjacent frames of pictures, types of the adjacent frames of pictures, after obtaining the target optical flow information of the target frames of pictures;
determining, when the adjacent frames of pictures are P frames of pictures, optical flow information of preset images in the first image sequence of the adjacent frames of pictures relative to images with corresponding resolutions in the second image sequence based on the target optical flow information of the target frames of pictures, and setting the optical flow information of the preset images relative to the images with the corresponding resolutions in the second image sequence as second initial optical flow information; and
executing repeatedly, according to a sequence of resolutions of second target images from low to high, step of determining optical flow information of the second target images relative to the images with the resolutions in the second image sequence based on the second initial optical flow information, until the final optical flow information of the images with the same resolutions as the raw videos in the first image sequence relative to the images with the corresponding resolutions in the second image sequence is determined, and setting the final optical flow information as target optical flow information corresponding to the adjacent frames of pictures, wherein the second target images are images with higher resolutions than the preset images in the first image sequence of the adjacent frames of pictures.

6. The method according to claim 1, wherein splicing the overlapping region of every two adjacent raw videos based on the target optical flow information to obtain the target videos comprises:
splicing the overlapping regions according to distances between the dynamic image recorders, interpupillary distance information and the target optical flow information to obtain two target videos respectively for a left eye and a right eye.

7. The method according to claim 1, further comprising:
partitioning background blocks and object blocks in the target videos based on the target optical flow information; and
performing ODSV video coding on the target videos according to a result of partitioning.

8. A non-transitory computer readable storage medium, storing a computer program thereon, wherein the program, when being executed by a processor, cause the processor being configured to:
acquire a plurality of raw videos, wherein the plurality of raw videos are videos acquired by a plurality of dynamic image recorders arranged according to preset locations;
determine an overlapping region between every two adjacent raw videos according to preset rules corresponding to the preset locations, wherein the adjacent raw videos are the raw videos acquired by the dynamic image recorders arranged adjacent to each other;
perform a multi-stage optical flow calculation on the raw videos in each overlapping region to obtain a plurality of pieces of target optical flow information; and
splice the overlapping region of every two adjacent raw videos based on the target optical flow information to obtain target videos;
wherein performing multi-stage optical flow calculation on the raw videos in each overlapping region to obtain the plurality of pieces of target optical flow information comprises:
performing operations as follows on a plurality of target frames of pictures of the two raw videos in the overlapping region:
performing downsampling on corresponding frames of pictures of the two raw videos respectively to obtain two image sequences arranged from low resolution to high resolution;
determining a first initial optical flow information of a first image in a first image sequence relative to an image with a corresponding resolution in a second image sequence, wherein the first image is an image with a lowest resolution in the image sequence;
determining optical information of first target images in the first image sequence relative to images with corresponding resolutions in the second image sequence based on the first initial optical flow information, and setting the optical information of the first target images relative to the images with the corresponding resolutions in the second image sequence as the first initial optical flow information;
wherein the first target images are images other than the first image in the first image sequence; and
executing repeatedly, according to a sequence of resolutions of the first target images from low to high, step of determining the optical information of the first target images relative to the images with the corresponding resolutions in the second image sequence based on the first initial optical flow information, until final optical flow information of images with same resolutions as the raw videos in the first image sequence relative to the images with the corresponding resolutions in the second image sequence is determined, and setting the final optical flow information as the target optical flow information corresponding to the target frames of pictures.

9. An electronic device, comprising:
a memory, storing a computer program thereon; and
a processor, configured to execute the computer program in the memory, so as to cause the processor to:
acquire a plurality of raw videos, wherein the plurality of raw videos are videos acquired by a plurality of dynamic image recorders arranged according to preset locations;
determine an overlapping region between every two adjacent raw videos according to preset rules corresponding to the preset locations, wherein the adjacent raw videos are the raw videos acquired by the dynamic image recorders arranged adjacent to each other;
perform a multi-stage optical flow calculation on the raw videos in each overlapping region to obtain a plurality of pieces of target optical flow information; and
splice the overlapping region of every two adjacent raw videos based on the target optical flow information to obtain target videos;
wherein the processor is further configured to:
performing operations as follows on a plurality of target frames of pictures of the two raw videos in the overlapping region:
performing downsampling on corresponding frames of pictures of the two raw videos respectively to obtain two image sequences arranged from low resolution to high resolution;
determining a first initial optical flow information of a first image in a first image sequence relative to an image with a corresponding resolution in a second image sequence, wherein the first image is an image with a lowest resolution in the image sequence;
determining optical information of first target images in the first image sequence relative to images with corresponding resolutions in the second image sequence based on the first initial optical flow information, and setting the optical information of the first target images relative to the images with the corresponding resolutions in the second image sequence as the first initial optical flow information;
wherein the first target images are images other than the first image in the first image sequence; and
executing repeatedly, according to a sequence of resolutions of the first target images from low to high, step of determining the optical information of the first target images relative to the images with the corresponding resolutions in the second image sequence based on the first initial optical flow information, until final optical flow information of images with same resolutions as the raw videos in the first image sequence relative to the images with the corresponding resolutions in the second image sequence is determined, and setting the final optical flow information as the target optical flow information corresponding to the target frames of pictures.

10. The electronic device according to claim 9, wherein the processor is configured to: performing time synchronization on the plurality of raw videos; and calibrating the plurality of synchronized raw videos;
 the processor is further configured to: determining an overlapping region between every two adjacent calibrated raw videos according to the preset rules corresponding to the preset locations; and
 the processor is further configured to: splicing the overlapping region between every two adjacent calibrated raw videos based on the target optical flow information.

11. The electronic device according to claim 9, wherein the processor is configured to: determining a candidate optical flow information by using a gradient descent method on the basis of each piece of the initial optical flow information; and
 the processor is further configured to: determining the optical flow information of the target images in the first image sequence relative to the images with the corresponding resolutions in the second image sequence based on the initial optical flow information and/or the candidate optical flow information.

12. The electronic device according to claim 9, wherein the processor is configured to:
 determining Sobel features in the target frames of pictures; and
 determining an error function in optical flow calculation based on the Sobel features.

13. The electronic device according to claim 9, wherein the processor is configured to:
 determining, according to a relevance degree between the target frames of pictures and adjacent frames of pictures, types of the adjacent frames of pictures, after obtaining the target optical flow information of the target frames of pictures;
 determining, when the adjacent frames of pictures are P frames of pictures, optical flow information of preset images in the first image sequence of the adjacent frames of pictures relative to images with corresponding resolutions in the second image sequence based on the target optical flow information of the target frames of pictures, and setting the optical flow information of the preset images relative to the images with the corresponding resolutions in the second image sequence as second initial optical flow information; and
 executing repeatedly, according to a sequence of resolutions of second target images from low to high, step of determining optical flow information of the second target images relative to the images with the resolutions in the second image sequence based on the second initial optical flow information, until the final optical flow information of the images with the same resolutions as the raw videos in the first image sequence relative to the images with the corresponding resolutions in the second image sequence is determined, and setting the final optical flow information as target optical flow information corresponding to the adjacent frames of pictures, wherein the second target images are images with higher resolutions than the preset images in the first image sequence of the adjacent frames of pictures.

14. The electronic device according to claim 9, wherein the processor is configured to:
 splicing the overlapping regions according to distances between the dynamic image recorders, interpupillary distance information and the target optical flow information to obtain two target videos respectively for a left eye and a right eye.

15. The electronic device according to claim 9, wherein the processor is configured to:
 partitioning background blocks and object blocks in the target videos based on the target optical flow information; and
 performing ODSV video coding on the target videos according to a result of partitioning.

* * * * *